United States Patent
Kinoshita et al.

[11] Patent Number: 5,808,561
[45] Date of Patent: Sep. 15, 1998

[54] DRIVE ASSIST SYSTEM FOR A VEHICLE AND THE METHOD THEREOF

[75] Inventors: Masahiro Kinoshita, Ota; Atsushi Ikeda, Ashikaga; Kazumasa Arai, Ota, all of Japan

[73] Assignee: Fuji Jukogyo Kabushiki Kaisha, Tokyo, Japan

[21] Appl. No.: 819,386

[22] Filed: Mar. 17, 1997

[30] Foreign Application Priority Data

Apr. 10, 1996 [JP] Japan .................................. 8-088499

[51] Int. Cl.$^6$ ....................................................... G08G 1/16
[52] U.S. Cl. .......................... 340/903; 340/436; 340/438; 180/167; 180/169
[58] Field of Search ..................................... 340/435, 436, 340/438, 439, 903, 904, 905; 180/167, 168, 169, 170; 364/461; 348/148, 149; 701/301

[56] References Cited

U.S. PATENT DOCUMENTS

| | | | |
|---|---|---|---|
| 5,594,414 | 1/1997 | Namngani | 340/436 |
| 5,594,645 | 1/1997 | Nishimura et al. | 340/903 |
| 5,612,686 | 3/1997 | Takano et al. | 340/903 |
| 5,626,669 | 5/1997 | Asano et al. | 340/436 |
| 5,631,639 | 5/1997 | Hibino et al. | 340/903 |
| 5,635,922 | 6/1997 | Choi et al. | 340/903 |
| 5,642,093 | 6/1997 | Kinoshita et al. | 340/439 |

*Primary Examiner*—Brent A. Swarthout
*Assistant Examiner*—Van T. Trieu
*Attorney, Agent, or Firm*—Beveridge, DeGrandi, Weilacher & Young, L.L.P.

[57] ABSTRACT

In a drive assist system of a vehicle having a function of detecting an inter-vehicle distance between vehicles and a warning is given to a driver for preventing a collision, disclosed are an apparatus for detecting a deceleration of a preceding vehicle based on a vehicle speed of the preceding vehicle, an apparatus for establishing a safe inter-vehicle distance between the vehicle and the preceding vehicle based on the deceleration of the preceding vehicle, and an apparatus for comparing the inter-vehicle distance with the safe inter-vehicle distance and for outputting a warning signal when the inter-vehicle distance is smaller than the safe inter-vehicle distance. Thus, when the deceleration of the preceding vehicle is small, the warning is not issued until the inter-vehicle distance becomes small, whereby the driver's intention can be reflected on the drive assist system.

5 Claims, 3 Drawing Sheets

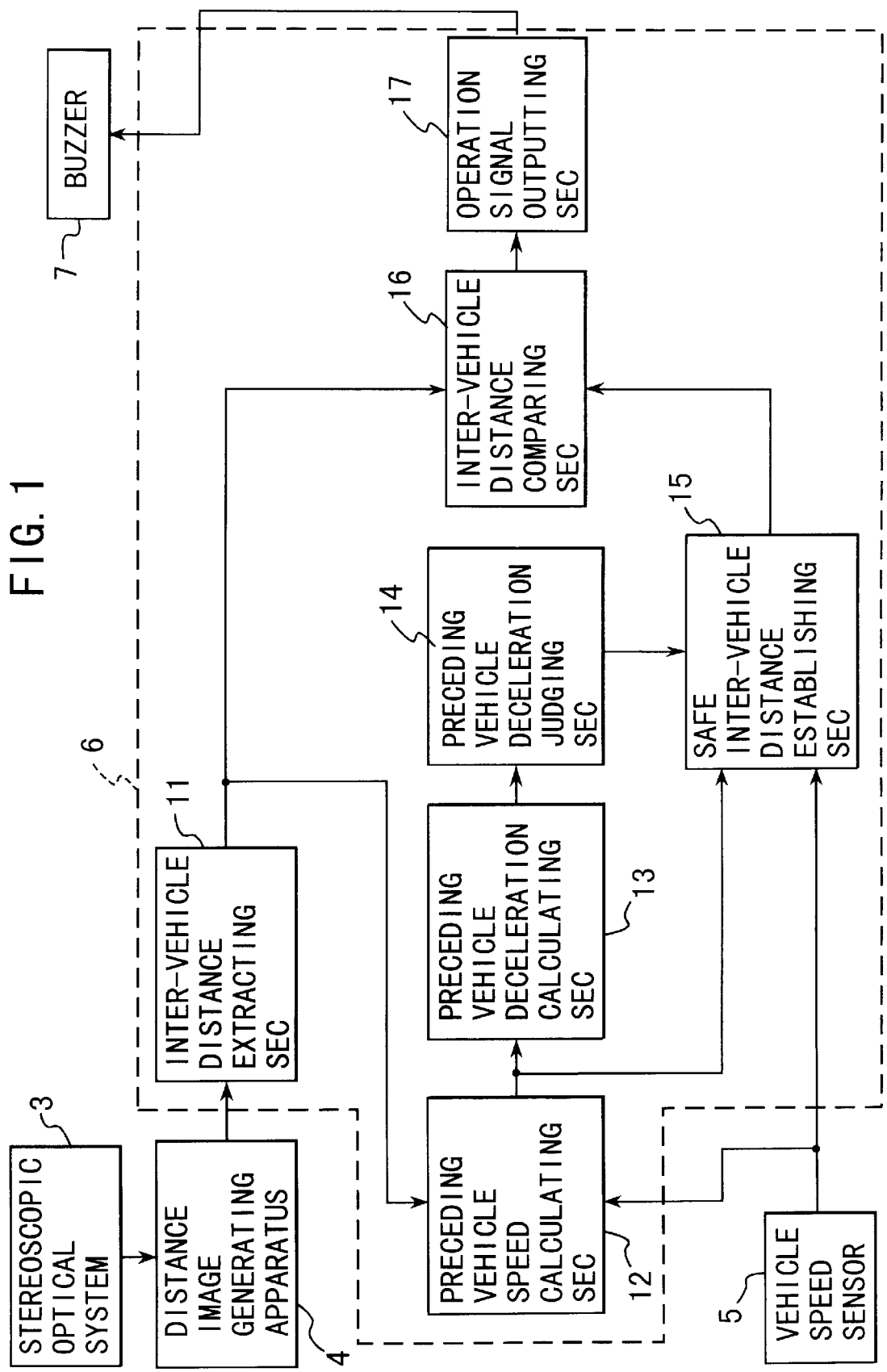

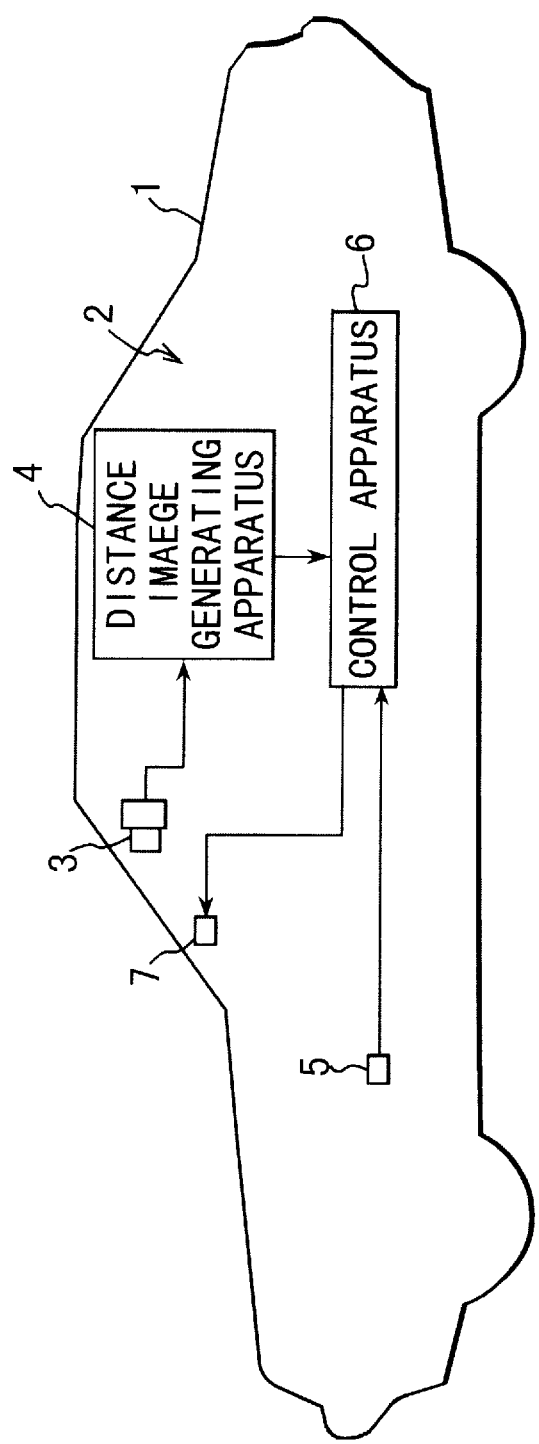

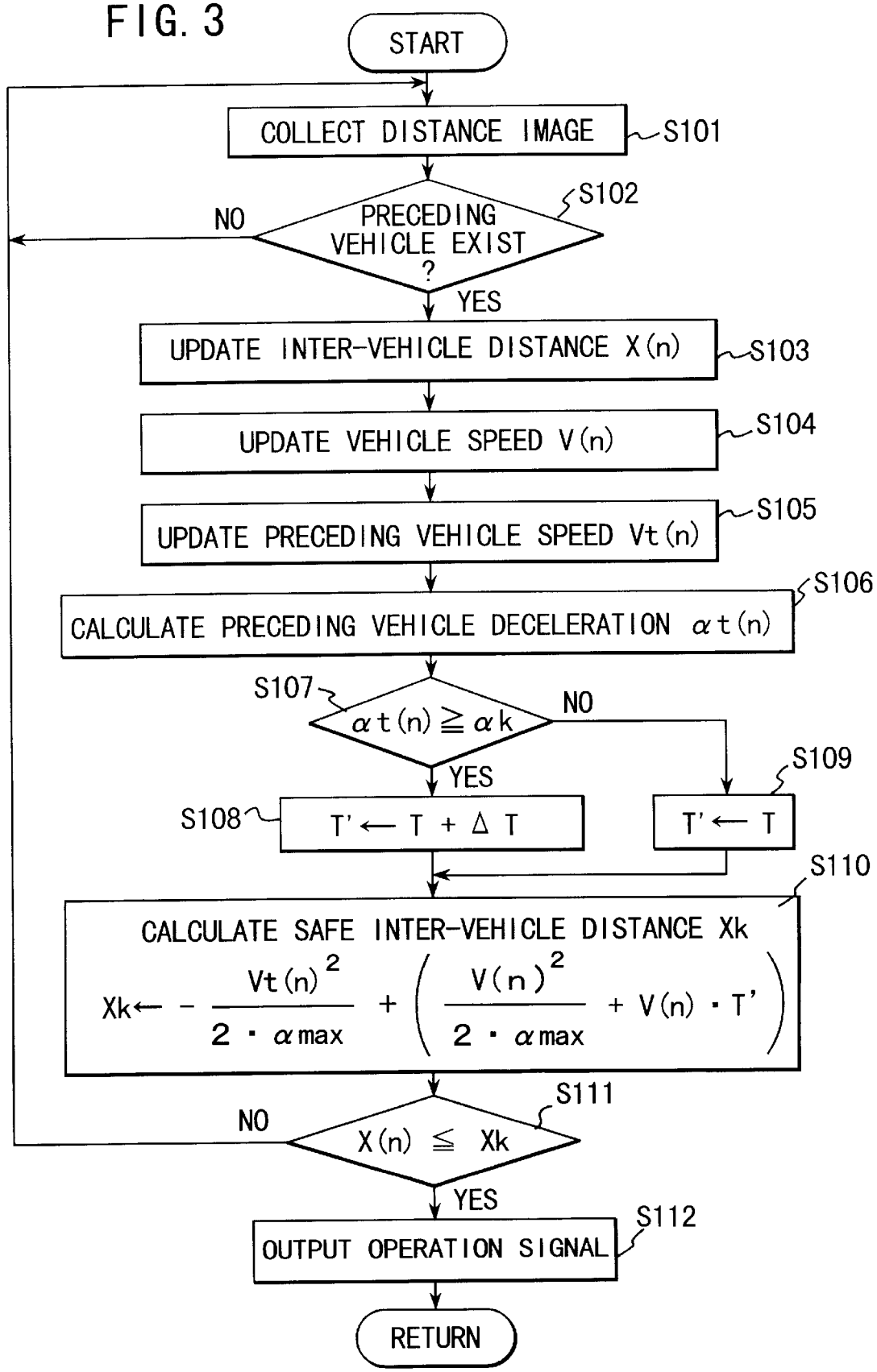

DRIVE ASSIST SYSTEM FOR A VEHICLE AND THE METHOD THEREOF

BACKGROUND OF THE INVENTION

1. Field of the Invention

The present invention is directed to a drive assist system for a vehicle and a method thereof, and more particularly to a drive assist system and method capable of assisting a driver's operation of the vehicle so as to maintain a proper distance between vehicles running in the same direction.

2. Prior Arts

With an increase of the number of motor vehicles, frequent occurrence of traffic jams has also increased. In particular, such traffic jams usually occur on the roads and highways in Large cities and towns therearound. When a driver encounters traffic jams, he has to continue to pay attention to a distance between his own car and a car running ahead so as to avoid collision with that preceding car. He has frequently to step on the brake pedal and the accelerator pedal in such traffic jams. This Leads to a driver's stress and wearing which may induce a collision with the vehicle running ahead. Generally, it is difficult to maintain a proper distance between two cars especially in such a condition as his own car or other vehicle changing speeds.

In order to save the driver from such stress or wearing, recently various approaches for safe driving have been attempted. One of these approaches is the development of an ADA (Active Drive Assist System) for positively assisting the driver's operation of the vehicle under various traffic conditions. The ADA is a system which gives warnings to drivers, avoidance operations and the like when danger is imminent by estimating various possibilities of such a collision with the preceding vehicle, a contact with an obstacle, a running off Lane and other troubles from surrounding information and running conditions of his own vehicle. As an apparatus for collecting surrounding information, there are known techniques using radar, Laser-beam or cameras. Japanese Patent Application Laid-open No. Toku-Kai-Hei 5-265547 has been disclosed by the inventor of the present invention, in which the scenery or objects ahead of the vehicle are taken by a plurality of cameras installed on the vehicle and this optical information is recognized as three-dimensional image information.

It is an important function of the ADA to assist the vehicle driver so as to maintain a proper distance between his vehicle and a preceding vehicle (hereinafter, referred to as an inter-vehicle distance) and to avoid a collision with the preceding vehicle. As an example of this kind of technology, Journal of The Society of Automotive Engineers of Japan Vol. 43, No. 2, 1989, an article "Rear-end Collision Warning System using Laser for Heavy-duty Trucks" discloses a technology in which a vehicle speed of the preceding vehicle and a relative vehicle speed of the subject vehicle with respect to the preceding vehicle are calculated based on a vehicle speed of a subject vehicle and a distance between the subject vehicle and the preceding vehicle detected by a laser beam-later apparatus, and when the distance between two vehicles comes within a safe inter-vehicle distance calculated based on this relative vehicle speed, an alarm is sent out to warn a collision with the preceding vehicle.

However, this warning apparatus has such a short-coming that since the safe inter-vehicle distance is calculated from the relative vehicle speed of the subject vehicle with respect to the preceding vehicle, it is not taken into consideration whether the inter-vehicle distance has been changed because of the behavior of the preceding vehicle or because of the behavior of the subject vehicle. Therefore, in this warning apparatus, the alarm is issued regardless of a driver's will, for example, in such a way that even when the driver intentionally reduces the inter-vehicle distance in order to overtake the preceding vehicle, the alarm is given.

SUMMARY OF THE INVENTION

In view of the above, an object of the present invention is to provide a vehicular drive assist system capable of reflecting the driver's will by means of clearly discriminating the reduction of the inter-vehicle distance caused by the behavior of the preceding vehicle from the one of the inter-vehicle distance coming from the driver's intention.

In order to achieve the object, a drive assist system of a vehicle comprises:

inter-vehicle distance calculating means for detecting a preceding vehicle running ahead of the vehicle and calculating an inter-vehicle distance between the vehicle and the preceding vehicle;

vehicle speed calculating means for calculating a vehicle speed of the vehicle, preceding vehicle speed calculating means for calculating a vehicle speed of the preceding vehicle based on the inter-vehicle distance and the vehicle speed of the vehicle;

collision preventing means for preventing a collision of the vehicle with the preceding vehicle;

preceding vehicle deceleration calculating means for calculating a deceleration of the preceding vehicle based on the vehicle speed of the preceding vehicle;

preceding vehicle deceleration judging means for making a judgment of whether or not the deceleration of the preceding vehicle is larger than a specified reference value;

leeway time calculating means for calculating a leeway time based on the judgment;

safe inter-vehicle distance establishing means for establishing a safe inter-vehicle distance between the vehicle and the preceding vehicle at Least based on the Leeway time and the vehicle speed of the vehicle;

inter-vehicle distance comparing means for comparing the inter-vehicle distance with the safe inter-vehicle distance and for outputting a signal when the inter-vehicle distance is smaller than the safe inter-vehicle distance; and outputting means responsive to the signal for outputting an operation signal so as to operate the collision preventing means.

DESCRIPTION OF THE DRAWINGS

FIG. 1 is a functional block diagram showing a vehicular drive assist system according to the present invention;

FIG. 2 is a schematic view of a vehicular drive assist system according to the present invention; and FIG. 3 is a flowchart showing the operation of a control of a vehicular drive assist system according to the present invention.

DETAILED DESCRIPTION OF PREFERRED EMBODIMENTS

Referring now to FIG. 2, numeral 1 denotes a vehicle and numeral 2 denotes a drive assist system according to the present invention. The drive assist system 2 comprises a stereoscopic optical system 3 for taking an optical image of objects ahead of the vehicle 1, a distance image generating apparatus 4 for generating a distance image from the optical image taken by the stereoscopic optical system 3, a vehicle speed sensor 5 for detecting a speed v of the vehicle 1 and a control apparatus 6 for processing the distance information of the distance image generating apparatus 4 and the vehicle speed detected by the vehicle speed sensor 5 and for producing an output to a buzzer 7.

The stereoscopic optical system 3 is composed of a pair of CCD cameras using a solid-state image component such as a Charge Coupled Device (CCD). These CCD cameras are disposed one for each on the left and right sides of the front ceiling in the passenger compartment of the vehicle 1 with a specified widthwise distance so as to take stereoscopic pictures.

Further, the distance image generating apparatus 4 is mainly composed of an image processor, in which distance information is obtained over an entire image of a pair of stereoscopic pictures taken by the stereoscopic optical system 3 according to a principle of triangulation, distance images comprising a three-dimensional distance distribution are formed based on this distance information and these distance images are inputted to the control apparatus 6.

The control apparatus 6 forming a multi-microprocessor is an apparatus for processing the distance images from the distance image generating apparatus 4, extracting necessary information therefrom, making a collision preventing control which will be described hereinafter based on the vehicle speed v detected by the vehicle speed sensor 5, and outputting a signal to the buzzer 7.

As shown in FIG. 1, the control apparatus 6 comprises an inter-vehicle distance extracting section 11, a preceding vehicle speed calculating section 12, a preceding vehicle deceleration calculating section 13, a preceding vehicle deceleration judging section 14, a safe inter-vehicle distance establishing section 15, an inter-vehicle distance comparing section 16 and an operation signal outputting section 17.

The inter-vehicle distance extracting section 11 serves as inter-vehicle distance calculating means for extracting an image of the preceding vehicle having a box-shape pattern from the stereoscopic picture images of the objects inputted from the distance image generating apparatus 4 and outputting a distance x to the preceding vehicle (inter-vehicle distance) to the preceding vehicle speed calculating section 12 and the inter-vehicle distance comparing section 16.

The preceding vehicle speed calculating section 12 calculates a preceding vehicle speed $v_t$ based on a change of the inter-vehicle distance x versus time and the vehicle speed v of the vehicle 1 and outputs that preceding vehicle speed $v_t$ to the preceding vehicle deceleration calculating section 13 and the safe inter-vehicle distance establishing section 15, respectively. Expressing a present preceding vehicle speed as $v_{t(n)}$ with a subscript (n), it is calculated according to the following equation:

$$v_{t(n)} = (x_{(n)} - x_{(n-1)})/\Delta t + v_{(n)} \quad (1)$$

where $x_{(n)}$ is an inter-vehicle distance presently obtained, $x_{(n-1)}$ is an inter-vehicle distance previously obtained, $\Delta t$ is a time interval for measurement and calculation and $v_{(n)}$ is a present vehicle speed of the vehicle 1.

The preceding vehicle deceleration calculating section 13 is formed as preceding vehicle deceleration calculating means by which a deceleration $\alpha_t$ of the preceding vehicle is calculated based on the preceding vehicle speed $v_t$ obtained by the preceding vehicle speed calculating section 12 and is outputted to the preceding vehicle deceleration judging section 14. The present deceleration $\alpha_{t(n)}$ of the preceding vehicle is calculated according to the following equation:

$$\alpha_{t(n)} = (v_{t(n-1)} - v_{t(n)})/\Delta t \quad (2)$$

where $v_{t(n-1)}$ is a preceding vehicle speed previously obtained, $v_{t(n)}$ is a preceding vehicle speed presently obtained and $\Delta t$ is a time interval for measurement and calculation.

In the preceding vehicle deceleration judging section 14, the preceding vehicle deceleration $\alpha t$ inputted from the preceding vehicle deceleration calculating section 13 is compared with a reference deceleration $\alpha_k$ predetermined by experiments and the like and the judgment of whether or not the preceding vehicle deceleration at is larger than the reference deceleration $\alpha_k$ is outputted to the safe inter-vehicle distance establishing section 15.

In the safe inter-vehicle distance establishing section 15, a safe inter-vehicle distance $x_k$ is calculated according to the following equation and outputted to the inter-vehicle distance comparing section 16:

$$x_k = -v_{t(n)}^2/(2 \cdot \alpha_{tmax}) + (v_{(n)}^2/(2 \cdot \alpha_{max}) + v_{(n)} \cdot T') \quad (3)$$

where $v_{(n)}$ is a vehicle speed presently obtained, $v_{t(n)}$ is a preceding vehicle speed presently obtained, $\alpha_{max}$ and $\alpha_{tmax}$ are an established maximum deceleration value of the subject vehicle and the preceding vehicle, respectively and T' is a leeway time. Here, the established maximum deceleration value is a deceleration of a vehicle obtained by an average driver when he brakes hard and generally the value is established to be around 0.6 G. Further, the leeway time is a time (seconds) since a preceding vehicle passes a point until a following vehicle passes that point.

In the equation (3), the leeway time T' is established to be a value T+ΔT (T is a normal leeway time; ΔT is a predetermined time increment) when the preceding vehicle deceleration $\alpha_t$ is larger than the reference deceleration $\alpha_k$ and it is established to be a value T when the preceding vehicle deceleration $\alpha_t$ is smaller than the reference deceleration $\alpha_k$. In other words, in case where the preceding vehicle deceleration $\alpha_t$ is large, the leeway time T' is established to be a large value so that the safe inter-vehicle distance $x_k$ is increased and in case where the preceding vehicle deceleration $\alpha_t$ is small, the leeway time T' is established to be a small value so that the safe inter-vehicle distance $x_k$ is decreased. The time increment ΔT may be established so as to vary according to the vehicle speed. Further, the safe inter-vehicle distance $x_k$ may be calculated according to an equation directly parameterizing the preceding vehicle deceleration $\alpha_t$ without using the leeway time T'.

Further, in the inter-vehicle distance comparing section 16, the safe inter-vehicle distance $x_k$ determined by the safe inter-vehicle distance establishing section 15 is compared with the inter-vehicle distance x (present inter-vehicle distance $x_{(n)}$ and a signal is outputted to the operation signal outputting section 17.

The operation signal outputting section 17 is formed as operation signal outputting means for outputting a signal so as to operate the buzzer 7 when the inter-vehicle $x_{(n)}$ comes within the safe inter-vehicle distance $x_k$.

Next, the control routine of thus constituted drive assist system will be described with reference to a flowchart shown in FIG. 3.

First, at a step S101 (hereinafter, referred to as just S number) the frontal scenery is taken by the stereoscopic optical system 3 as picture images. Then, in the distance image generating apparatus 4 the distance images of objects are generated and image processing such as extracting a feature of the box-shape pattern from these distance images is performed. Thus, the preceding vehicle is identified among the distance images.

Next, the program goes to S102 where it is judged whether or not the preceding vehicle exists and if it exists the program steps to S103. If it does not exist, the program returns to S101.

When it is judged that the preceding vehicle exists as a result of the judgment in S102, the program goes to S103 where the inter-vehicle distance x between the subject vehicle and the preceding vehicle is obtained and this inter-vehicle distance x is updated and memorized as a present inter-vehicle distance $x_{(n)}$. Further, the previously memorized value is updated and rememorized as a previous inter-vehicle distance $x_{(n-1)}$.

Then, the program goes to S104 in which the vehicle speed v of the subject vehicle is read in from the vehicle speed sensor 5 and this vehicle speed v is updated and memorized as a present vehicle speed $v_{(n)}$ of the subject vehicle. The previously memorized value is updated and rememorized as a previous vehicle speed $v_{(n-1)}$ of the subject vehicle.

Then, the program goes to S105 where the vehicle speed $v_t$ of the preceding vehicle is calculated according to the equation (1) in the preceding vehicle speed calculating section 12. The calculated $v_t$ is updated and memorized as a present vehicle speed $v_{t(n)}$ of the preceding vehicle and further the previously memorized value is updated and memorized as a previous vehicle speed $v_{t(n-1)}$ of the preceding vehicle.

After that, the program goes to S106 where the deceleration $\alpha_{t(n)}$ of the preceding vehicle is calculated based on the equation (2) in the preceding vehicle deceleration calculating section 13.

Then, the program goes to S107 where thus calculated deceleration $\alpha_{t(n)}$ of the preceding vehicle is compared with the reference deceleration $\alpha_k$ which has been established beforehand by experiments and the like. As a result of this, if the preceding vehicle deceleration $\alpha_{t(n)}$ is larger than the reference deceleration $\alpha_k$ (the preceding vehicle has a large deceleration), the program goes to S108 where the leeway time T' that is used in the calculation of the safe inter-vehicle distance $x_k$ is established to be a large value T+ΔT (T: normal leeway time, ΔT: incremental time). On the other hand, if the preceding vehicle deceleration $\alpha_{t(n)}$ is smaller than the reference deceleration $\alpha_k$ (the preceding vehicle has a small deceleration), the program skips to S109 where the leeway time T' is established to be a normal leeway time T.

After the leeway time T' is established at S108 or S109, the program steps to S110 where the safe inter-vehicle distance $x_k$ is calculated according to the equation (3). The processes at S108, S109 and S110 correspond to ones performed in the safe inter-vehicle distance calculating section 15.

Then, the program goes to S111 at which the present inter-vehicle distance $x_{(n)}$ is compared with the safe inter-vehicle distance $x_k$. This process corresponds to the one performed in the inter-vehicle distance comparing section 16. When the present inter-vehicle distance $x_{(n)}$ becomes smaller than the safe inter-vehicle distance $x_k$, the program goes to S112 where a signal is outputted to the operation signal outputting section 17 so as to operate the buzzer 7. On the other hand, when the present inter-vehicle distance $x_{(n)}$ is larger than the safe inter-vehicle distance $x_k$, the program returns to S101.

Thus, the safe inter-vehicle distance is established according to the deceleration of the preceding vehicle. For example, when the preceding vehicle is decelerated at a larger deceleration than a specified value, that is, when the preceding vehicle is abruptly decelerated for some reason, the safe inter-vehicle distance is established to be a large value and consequently the warning is given at an earlier timing than the normal case. On the other hand, in a case where the subject vehicle is accelerated to overtake the preceding vehicle and the inter-vehicle distance is abruptly reduced, there occurs no early warning, therefore the driver can be relieved from annoying warnings sent out every time he attempts to overtake preceding vehicles.

In this embodiment, the kind of warning is assumed to be a warning by way of sound, however, other kinds of warnings such as a warning light, a picture display, an oral warning or the combination of these may be employed. Further, in lieu of the warning buzzer, an automatic braking apparatus may be used.

Further, the deceleration of the preceding vehicle may be calculated from other data sources, such as deceleration detected by an acceleration sensor of the subject vehicle and differential of a relative vehicle speed between two vehicles.

In summary, according to the present invention, it is possible to issue a collision preventing warning, discriminating between a case where a driver reduces the inter-vehicle distance intentionally and a case where a preceding vehicle is decelerated to reduce the inter-vehicle distance, whereby issuance of warnings every time the driver accelerates his vehicle to overtake other cars can be prevented.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A drive assist system for a vehicle having inter-vehicle distance calculating means for detecting a preceding vehicle running ahead of the vehicle and for calculating an inter-vehicle distance between the vehicle and the preceding vehicle, vehicle speed calculating means for calculating a vehicle speed of the vehicle, preceding vehicle speed calculating means for calculating a vehicle speed of the preceding vehicle based on the inter-vehicle, distance and the vehicle speed of the vehicle and collision preventing means for preventing a collision of the vehicle with the preceding vehicle, said drive assist system comprising:

preceding vehicle deceleration calculating means for calculating a deceleration of the preceding vehicle based on the vehicle speed of the preceding vehicle;

leeway time calculating means responsive to said deceleration of the preceding vehicle for calculating a leeway time;

safe inter-vehicle distance establishing means responsive to said leeway time and the vehicle speed for establishing a safe inter-vehicle distance between the vehicle and the preceding vehicle at least based on a multiplication of said leeway time and the vehicle speed of the vehicle;

inter-vehicle distance comparing means for comparing the inter-vehicle distance with said safe inter-vehicle distance and for outputting a signal when the inter-vehicle distance is smaller than said safe inter-vehicle distance; and outputting means responsive to said signal for outputting an operation signal so as to operate the collision preventing means.

2. A drive assist system for a vehicle having inter-vehicle distance calculating means for detecting a preceding vehicle running ahead of the vehicle and for calculating an inter-vehicle distance between the vehicle and the preceding vehicle, vehicle speed calculating means for calculating a vehicle speed of the vehicle, preceding vehicle speed calculating means for calculating a vehicle speed of the preceding vehicle based on the inter-vehicle distance and the vehicle speed of the vehicle, and collision preventing means for preventing a collision of the vehicle with the preceding vehicle, said drive assist system comprising:

preceding vehicle deceleration calculating means for calculating a deceleration of the preceding vehicle based on the vehicle speed of the preceding vehicle;

preceding vehicle deceleration judging means for making a judgment of whether or not said deceleration of the preceding vehicle is larger than a specified reference value;

leeway time calculating means responsive to said judgment for altering leeway time to increase when said deceleration is larger than said specified reference value;

safe inter-vehicle distance establishing means for establishing a safe inter-vehicle distance between the vehicle and the preceding vehicle at least based on a multiplication of said leeway time and the vehicle speed of the vehicle;

inter-vehicle distance comparing means for comparing the inter-vehicle distance with said safe inter-vehicle distance and for outputting a signal when the inter-vehicle distance is smaller than said safe inter-vehicle distance; and outputting means responsive to said signal for outputting an operation signal so as to operate the collision preventing means.

3. A drive assist system for a vehicle having inter-vehicle distance calculating means for detecting a preceding vehicle running ahead of the vehicle and for calculating an inter-vehicle distance between the vehicle and the preceding vehicle, vehicle speed calculating means for calculating a vehicle speed of the vehicle, preceding vehicle speed calculating means for calculating a vehicle speed of the preceding vehicle based on the inter-vehicle distance and the vehicle speed of the vehicle, and collision preventing means for preventing a collision of the vehicle with the preceding-vehicle, said drive assist system comprising:

preceding vehicle deceleration calculating means for calculating a deceleration of the preceding vehicle based on the vehicle speed of the preceding vehicle;

preceding vehicle deceleration judging means for making a judgment of whether or not said deceleration of the preceding vehicle is larger than a specified reference value;

leeway time calculating means for calculating a leeway time based on said judgment;

safe inter-vehicle distance establishing means for establishing a safe inter-vehicle distance between the vehicle and the preceding vehicle at least based on a multiplication of said leeway time and the vehicle speed of the vehicle;

inter-vehicle distance comparing means for comparing the inter-vehicle distance with said safe inter-vehicle distance and for outputting a signal when the inter-vehicle distance is smaller than said safe inter-vehicle distance; and outputting means responsive to said signal for outputting an operation signal so as to operate the collision preventing means.

4. A drive assist method for a vehicle having an inter-vehicle distance calculating apparatus for detecting a preceding vehicle running ahead of the vehicle and for calculating an inter-vehicle distance between the vehicle and the preceding vehicle, a vehicle speed calculating apparatus for calculating a vehicle speed of the vehicle, a preceding vehicle speed calculating apparatus for calculating a vehicle speed of the preceding vehicle based on the inter-vehicle distance and the vehicle speed of the vehicle, and a collision preventing apparatus for preventing a collision of the vehicle with the preceding vehicle, the method comprising the steps of:

calculating a deceleration of the preceding vehicle based on the vehicle speed of the preceding vehicle;

calculating a leeway time responsive to said deceleration of the preceding vehicle;

establishing a safe inter-vehicle distance between the vehicle and the preceding vehicle at least based on a multiplication of said leeway time and the vehicle speed of the vehicle;

comparing the inter-vehicle distance with said safe inter-vehicle distance;

outputting a signal when the inter-vehicle distance is smaller than said safe inter-vehicle distance; and outputting an operation signal in accordance with said signal so as to operate the collision preventing apparatus.

5. A drive assist method for a vehicle having an inter-vehicle distance calculating apparatus for detecting a preceding vehicle running ahead of the vehicle and for calculating an inter-vehicle distance between the vehicle and the preceding vehicle, a vehicle speed calculating apparatus for calculating a vehicle speed of the vehicle, a preceding vehicle speed calculating apparatus for calculating a vehicle speed of the preceding vehicle based on the inter-vehicle distance and the vehicle speed of the vehicle, and a collision preventing apparatus for preventing a collision of the vehicle with the preceding vehicle, the method comprising the steps of:

calculating a deceleration of the preceding vehicle based on the vehicle speed of the preceding vehicle;

making a judgment of whether or not said deceleration of the preceding vehicle is larger than a specified reference value;

calculating a leeway time in accordance with said judgment;

establishing a safe inter-vehicle distance between the vehicle and the preceding vehicle at least based on a multiplication of said leeway time and the vehicle speed of the vehicle;

comparing the inter-vehicle distance with said safe inter-vehicle distance;

outputting a signal when the inter-vehicle distance is smaller than said safe inter-vehicle distance; and outputting an operation signal in accordance with said signal so as to operate the collision preventing apparatus.

* * * * *